United States Patent [19]
Oudet et al.

[11] Patent Number: 5,136,194
[45] Date of Patent: Aug. 4, 1992

[54] SINGLE-PHASED COMPACT LINEAR ELECTROMAGNETIC ACTUATOR

[75] Inventors: Claude Oudet, Besancon; Daniel Prudham, Thise, both of France

[73] Assignee: Moving Magnet Technologies S.A., Besancon, France

[21] Appl. No.: 466,943

[22] Filed: Jan. 18, 1990

[30] Foreign Application Priority Data

Jun. 16, 1989 [FR] France ................. 89 08051

[51] Int. Cl.⁵ .................... H02K 13/16; G11B 5/55; G11B 21/12
[52] U.S. Cl. ............................ 310/15; 335/272; 360/105
[58] Field of Search .............. 310/13, 15, 14, 36; 360/98.06, 101, 105, 106; 335/222, 272

[56] References Cited

U.S. PATENT DOCUMENTS

| | | | |
|---|---|---|---|
| 3,536,941 | 10/1970 | Eaton et al. | 310/27 |
| 4,500,827 | 2/1985 | Merritt et al. | 310/15 |
| 4,924,123 | 5/1990 | Hamajima et al. | 310/15 |
| 4,937,481 | 6/1990 | Vitale | 310/13 |
| 4,945,269 | 7/1990 | Kamm | 310/15 |
| 4,985,652 | 1/1991 | Oudet et al. | 310/15 |

FOREIGN PATENT DOCUMENTS

3037648  4/1981  Fed. Rep. of Germany .

Primary Examiner—Steven L. Stephan
Assistant Examiner—D. L. Rebsch
Attorney, Agent, or Firm—Oblon, Spivak, McClelland, Maier & Neustadt

[57] ABSTRACT

A compact electromagnetic actuator having at least one stable position in the absence of current and an area of constant torque or force under a constant current. The actuator includes a movable member having at least one thin portion magnetized normal to the displacement direction thereof, as well as a stator structure defining an air gap therebetween. The stator structure includes first and second magnetic circuits separated by an air gap. The first magnetic circuit includes at least one energization electric coil and polar portions. At least one of the polar portions has a side bevelled strip inducing an adjustment for displacements near limit-stop of the movable member.

15 Claims, 4 Drawing Sheets

SINGLE-PHASED COMPACT LINEAR ELECTROMAGNETIC ACTUATOR

BACKGROUND OF THE INVENTION

1. Field of the Invention

This invention is related to an single-phased electromagnetic actuator having at least one stable position in the absence of current, and including a movable member and a stator structure, wherein the movable member includes a portion which is magnetized normal to the direction of displacement, and the thickness of the magnetized portion is small compared to the other dimensions thereof. The stator structure includes two magnetic circuits made of a very high magnetic permeability material and has an air gap in which is arranged at least one portion of the magnetized portion The stator structure includes at least a field electrical coil coupled with the magnetic circuit.

2. Discussion of Background

The International Patent Application CH-87-00063 filed Jun. 1, 1987 under priority of Switzerland Patent Application 222886 filed Jun. 2, 1986, discloses an electromagnetic actuating apparatus allowing the movable member to move a limited distance under a substantially constant force. This apparatus is particularly intended to actuate the read-write head of a rotative disk memory such as a hard disk, a magnetic disk or an optical disk.

The actuator apparatus involves several major drawbacks. First of all, the closing of the magnetic circuit is carried out by magnetic joints arranged either behind the stator structure, namely, normal to the displacement path of the movable member, or in planes parallel to the displacement path of the movable member. In both cases, the overall size of the stator structure is significantly increased, which can be prejudicial to a number of micromechanical applications where volume is critical as is particularly the case in hard disk units. Such actuators are particularly implemented in hard disk units for the displacement of the read head.

Still increasing requirements for miniaturization do not allow to use an actuator including a closed stator structure. On the other hand, in many applications the movable member is intended to be kept in a steady position in the absence of an energizing current of the electrical coil. The locking force of the movable member, however, in this steady position must be controlled so as to avoid an excessive sticking which would disturb the actuator's normal operation. This characteristic is for instance of value when the actuator is intended to control a plotting table pen. In this case, the plotting pen shall preferably remain, in the absence of current, in a raised position, i.e., separated from the paper after the current has moved the pen in the high position.

In the apparatus known in the prior art, a spring having a defined force resulting in a very little stiffness is used to obtain such a result. This solution is, however, not entirely satisfactory because the spring force acts in a permanent way. Hence, this will disturb the force exerted by the electromagnetic actuator. On the other hand, the differences in physical characteristics of a family of theoretically identical springs causes variation in the writing force, exceeding the allowable tolerances in the case where the writing force is poor. By way of example, if the writing force advised for a pen is about 0.5 newton, and if the spring is calibrated at 0.8 newton with a tolerance of + or −0.1 newton, such tolerance will generate a variation of + or − 20% on the writing force.

SUMMARY OF THE INVENTION

Accordingly, the objects of this invention are to provide a novel electromagnetic actuator which eliminates the above-noted drawbacks, allows exerting a constant force over a wide useful displacement range, has a minimal required space, and has a limit stop point leading to a "holding" (of the movable member in this position), after application of current to move the movable member, and which also can be taken out of the "holding" position.

To this end, the single-phased electromagnetic actuator according to this invention includes a stator structure and a movable member having at least one thin magnetized portion normal to the direction of the displacement thereof, as well as the stator structure, and defining an air gap therebetween. Such an air gap is included, on one hand, between a first magnetic circuit made of a very high magnetic permeability material and including at least one current-carrying field electrical coil, directed normal to the direction of the movable member displacement, and, on the other hand, a second magnetic circuit made of a very high magnetic permeability material. The movable member has a magnetized portion made of a material having a demagnetization characteristic which is substantially linear on the major part of the working range and the reversible permeability of which is near that of air. The magnetized portion has two N pairs of magnetized magnetic poles. Along opposite directions, magnetization is almost uniform and extends to length $Y_A$ as measured along the movable member displacement path. The stator structure includes, at least on one air gap side, $2N+1$ polar portions of which the lengths are, respectively $Y_1$, $Y_2$ and $Y_3$ as measured along the same displacement path, such lengths being substantially and at least equal to $Y_A$ diminished by the width of a notch wherein the winding turns are positioned. Both magnetic circuits forming the stator portion are not connected by magnetic joints but through non-magnetic spacers. The movable member stroke is at most equal to the shortest polar portions. Preferably, the movable member stroke on each side of a medium position is less than half the difference between the overall (total) length of the shortest magnetic circuit measured between its two exterior lateral bridges and the overall length of the magnetic parts. Surprisingly, the actuator thus formed provides a constant force along the displacement path of the movable member despite the absence of the closing of the magnetic circuits if the flow passage of the section in the iron is sufficient at the notches where the turns of the coil are placed.

According to an advantageous embodiment of the present invention, at least one of the polar portions presents a bevel perpendicular to the direction of displacement of the movable member. An end stop prevents displacement of the magnetized portion into the end zone, in which the holding force decreases.

According to a variation of the preceding embodiment, at least one of the lateral stops of at least one of the magnetic circuits and the corresponding lateral edge of the magnetized portion form an angle between 0 and 10 degrees between them. A lateral stop must be understood to mean the stop which is essentially perpendicular to the displacement direction and the magnetization direction.

This bevel or inclined lateral stop makes it possible to regulate the effect of the edge, assuring a holding force at at least one end of the course of the movable member. The device according to the present invention thus resolves, in a particularly elegant way, the problem which consists of obtaining a stable position in the absence of current, without the necessity of adding any mechanical piece, such as a spring. The devices according to the present invention find numerous applications, for example, for vertical displacement of a pen for a tracing table, an organ pipe valve or a hydraulic valve. The device according to the present invention can be carried out in numerous forms, and both the stator structure and the movable member can present various geometrical shapes.

Preferably, the stop is provided in the outer portion, to a distance measured along the displacement path, and in the direction of the actuator center to the air gap E width inferior to the air gap E.

According to a particular embodiment, the magnetized portion has a cylindrical shape and includes 2N magnetized coaxial portions, magnetized radially in alternate directions. The magnetized portion moves within a tubular air gap delimited by the first magnetic circuit and the second magnetic circuit.

By cylindrical or tubular, it should be understood what is meant is a structure of any section, for instance circular, square, polygonal, etc. According to an alternative, the second circuit is composed of a cylinder made of a very high permeability material which is integral with the cylindrical magnetized portion. The cylindrical magnetic circuit length is at least equal to the sum of the first magnetic circuit length and the movable member stroke.

According to an advantageous embodiment, especially for a large dimensioned structure, the movable member is constituted of a structure including two thin parallel magnets each including 2N portions, where N is an integer, magnetized normal to the displacement direction, with the thin magnets connected through spacers, and the volume included between both thin magnets being at least partially fixed with a very high magnetic permeability material. The movable member so constructed has a significant stiffness.

The electromagnetic actuator constructed according to this alternative, is quite readily mounted.

Advantageously, the first magnetic circuit and the second magnetic circuit are symmetrical with respect to the medium plane of the magnetized portion of the movable member normal to the magnetization direction.

The second magnetic circuit cannot include discrete stator poles. Due to this embodiment, the stiffness and amplitude of the force being exerted on the magnetized portion when the same is at an end stop is reduced.

Advantageously, the ratio between the length $Y_A$ of the magnetized portion and the air gap E thickness is greater than 4. Thus, there is provided an extended area wherein the force is constant.

According to an alternative embodiment, the magnetized portion has the form of two portions of a thin cylinder wall having a circular section, where the portions are symmetric with respect to the central generatrix and radially magnetized in opposite directions, the movable member displacement being in such case an angular displacement about the axis of the cylinder.

According to an advantageous embodiment, the bevel has a length between 1/5 and 1/20 of the corresponding portion length.

According to another embodiment, the movable member is constituted of a disk sector including a portion magnetized normal to a plane of the disk. The magnetized portion has 2N angular sectors, forming a coaxial ring with the disk, magnetized in opposite directions.

At least one of the magnetic circuits includes 2N+1 polar portions formed with angular sections, the angular dimension thereof corresponding to the angular magnetized sector dimensions of the movable member.

Accordingly, a rotational flat actuator with a very low required space is constructed due to the absence of a magnetic material for the closing of the magnetic flux. Such angular actuators are particularly adapted to the driving of an arm bearing the head of a hard disk unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
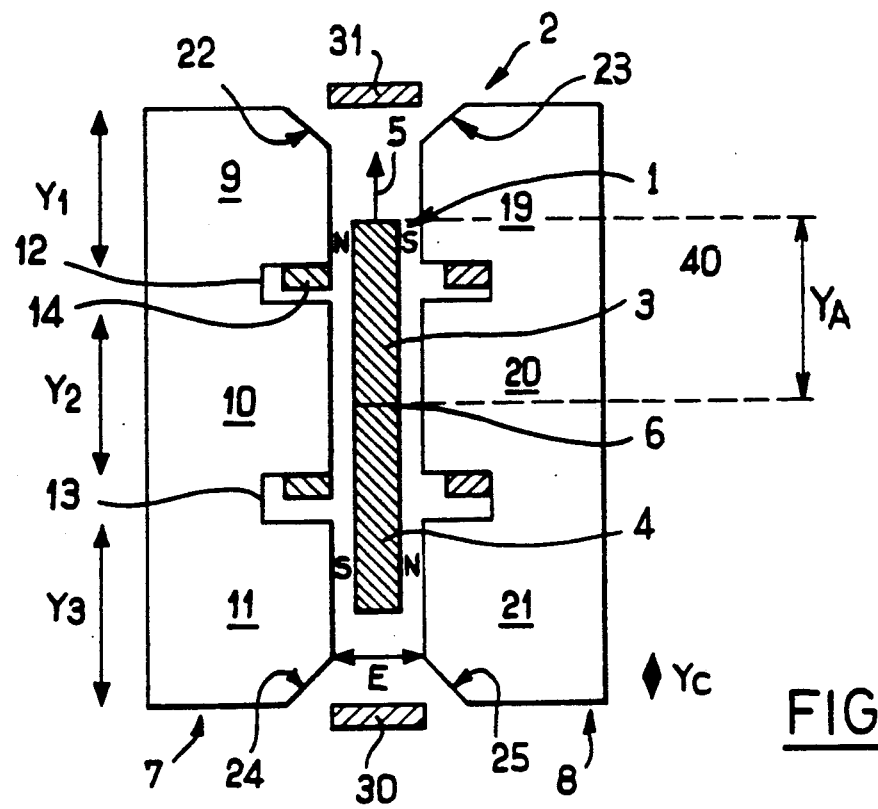
FIG. 1 is a cross sectional view of a linear actuator according to the present invention.

Referring now to the drawings, wherein like reference numerals designate identical or corresponding parts throughout the several views, and more particularly to FIG. 1 thereof, there is shown a sectional view of an exemplary embodiment of the present invention, a linear actuator including a movable member 1 and a stator structure 2. The movable member 1 is formed of two magnetized portions 3, 4 formed of thin magnet magnetized normal to the displacement direction shown by arrow 5. The movable member 1 can be constructed of two thin magnets attached along a connection line 6. The magnetized portion 1 can also be constructed from a monolithic ferromagnetic material wherein two opposite magnetization areas are induced. In the latter case, a medium transition area is to be provided.

The stator structure includes a first magnetic circuit 7 and a second magnetic circuit 8 defining therebetween an air gap of which the width E is adjusted through a spacer made of a non-magnetic rod arranged normal to the displacement direction of movable member 3. Clamping bolts, not shown (FIG. 1), provide a clamping of the stator structure so constructed. According to another embodiment, not shown in FIG. 1, both magnetic circuits 7, 8 are kept within a shell made of a rigid plastic material forming the actuator outer casing. The magnetic circuits 7, 8 are made of a very high magnetic permeability material such as iron-nickel. The first magnetic circuit 7 has three pole portions, a central pole portion 10 and two side pole portions 9, 11. Two notches 12, 13 are provided to accommodate the windings of the electrical field coil 14. The second magnetic circuit 8 is symmetrical to the first magnetic circuit 7 with respect to the medium plane of the movable portion 1.

Both magnetic circuits are connected through nonmagnetic spacers and the apparatus does not include any magnetic part for the closing of magnetic flux.

As shown in FIG. 1, the magnetic circuits 7, 8 include along the outer edges of the side polar portions 9, 11, 19, 21 bevels 22, 23, 24, 25. These bevels 22-25 are constituted by a strip of length $Y_C$ normal to the movable member 1 displacement path and to the magnetization direction of magnetized portions 3, 4. Such bevels 22-25 form with the plane normal to the magnetization direction of magnetized portions 3, 4 an angle of about 30°. The value of such an angle is only given by way of example. If the bevel length $Y_C$ is small, or if the bevel angle is small, the release force exerted on the movable member, when the same is at the end of its stroke, is significant. On the other hand, if the length $Y_C$ of bevel 22-25 is significant and if the angle is also significant, the release force exerted on the movable member will be smaller. The person skilled in the art will be able to determine the optimum conditions for a particular use. Such a compromise will be a function of desired locking force of the allowable tolerance on the constant force area, and on the allowable power to achieve the breakaway of the movable member when the same is at a limit stop. Stops 30, 31 limit the movable member displacement stroke and prevent it from exceeding a position wherein the release force becomes decreasing after being raised to a maximum. It is clear that the bevel can be constructed in the shape of a rounded edge.

$Y_1$ and $Y_3$ are the lengths of the side polar portions of the first magnetic circuit 7. In most of the cases, but not exclusively, $Y_1$ and $Y_3$ will be equal $Y_2$ is the length of the central magnetic portion 10 located between notches 12, 13 wherein the energizing coil windings 14 are positioned.

In the example described, the length $Y_1$ of the side magnetic portion 9 is equal to the length $Y_2$ of the central portion 10 increased by the air gap E width. The length $Y_A$ of the magnetized portion is equal to the length $Y_2$ of the central magnetic portion 10 increased by the length of the notch containing the coil.

An alternative to the embodiment described above, not shown, consists of "winding" the structure shown in FIG. 1 about an axis parallel to the displacement. Thus, this leads to a configuration wherein the movable member is composed of two magnetized portions 3, 4 tubular in shape and with a radially opposite magnetization. The first magnetic circuit 7 includes the superimposed polar portions 9, 10, 11 of annular shape. Two of the circular edges 22, 24 include a bevel 22, 24. The second magnetic circuit 8 is composed of a cylinder made of a high permeability magnetic material. Such cylinder 8 is integral with the magnetized portions 3, 4, and constitutes the core thereof. Ball bearings ensure the guiding of the movable member 1. Stops 30, 31, schematically illustrated in the drawings, restrain the maximum clearance of the movable member 1.

Figure 2:
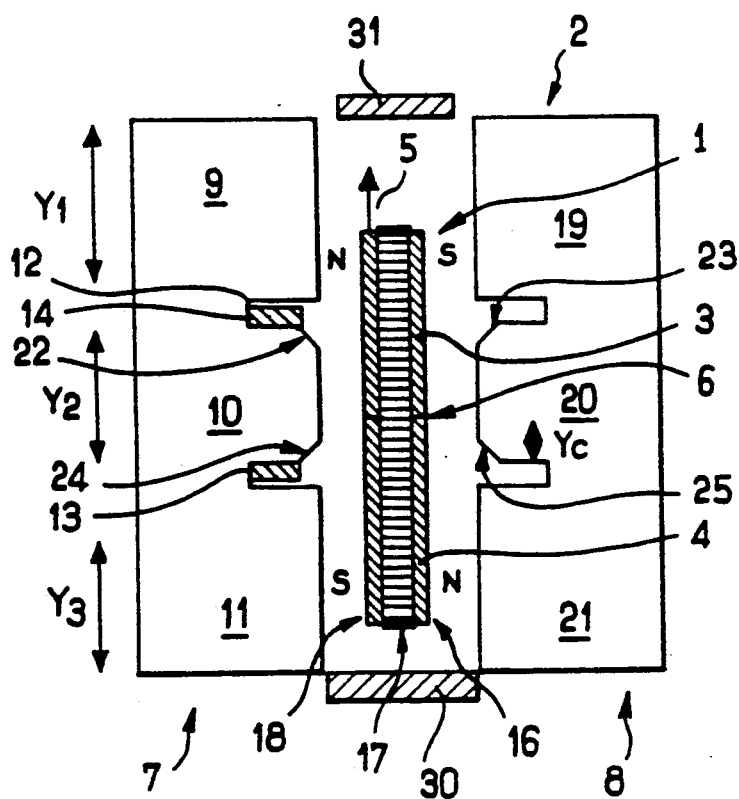
FIG. 2 is a sectional view of an alternative embodiment of the actuator of FIG. 1.

FIG. 2 shows a linear actuator wherein the movable member is composed of a composite structure including two thin magnets 16, 18 connected by spacers 17. The volume included between the two thin parallel magnets 16, 18 is filled with a very high permeability magnetic material. Such an embodiment is particularly advisable for large dimension actuators for which the movable member can exhibit stiffness problems. Naturally, such an embodiment is not limited to linear actuators having a plane movable member, but it can be implemented within rotational actuators or, additionally, in linear cylindrical actuators.

Figure 3:
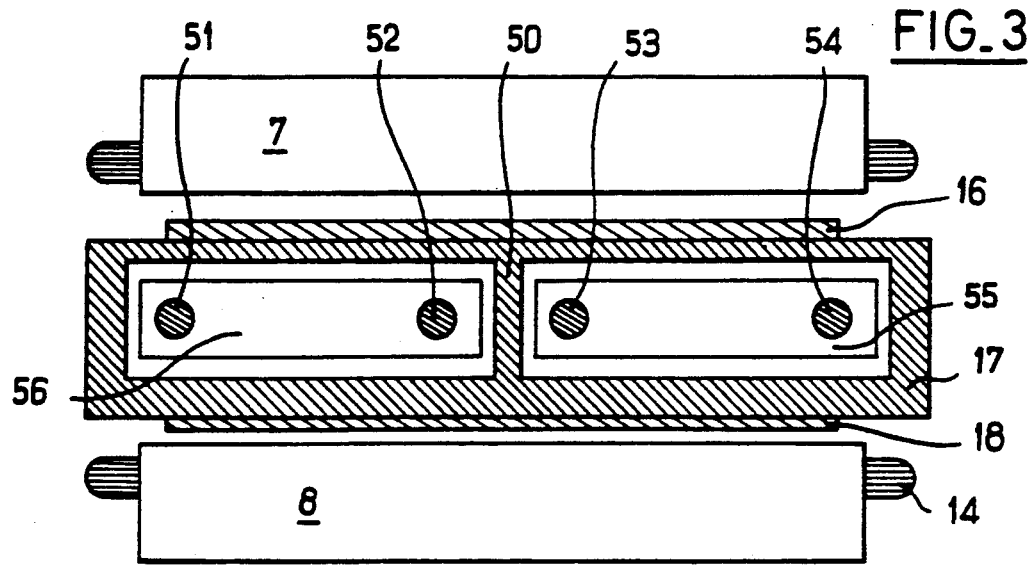
FIG. 3 is a sectional view of a second alternative embodiment.

FIG. 3 is a sectional view of a linear actuator including a stator structure formed of two magnetic circuits 7, 8 and one movable member comprising two thin parallel magnets 16, 18 connected by a magnet bracket 17 made of a rigid material such as carbon fiber or stainless steel.

The magnet bracket includes reinforcement ribs 50 arranged in the plane normal to the plane of the thin magnets 16, 18.

The assembly of the movable member formed of two parallel magnets 16, 18 and the magnet bracket 17 is slidable in translation. The guiding is carried out by fixed rigid columns 51, 54 arranged inside the magnet bracket 17. Such columns 51, 54 cooperate with ball bushings provided at both ends of the magnet bracket 17. The hollow volume of the magnet bracket 17 is occupied by a very high permeability material forming intermediate stators 55, 56. These intermediate stators are in the example described integral with the guide columns 51-54 and are arranged normal to the connection line of both magnetized portions and the magnetization direction. It is clear that a different guiding structure could be provided, for instance, with columns integral with the magnet bracket 17 and cooperating with the fixed ball bushings. The actuator could also be "wound" about one axis parallel to the translation axis in order to provide the cylindrical or semi-cylindrical linear actuator.

Figure 4:
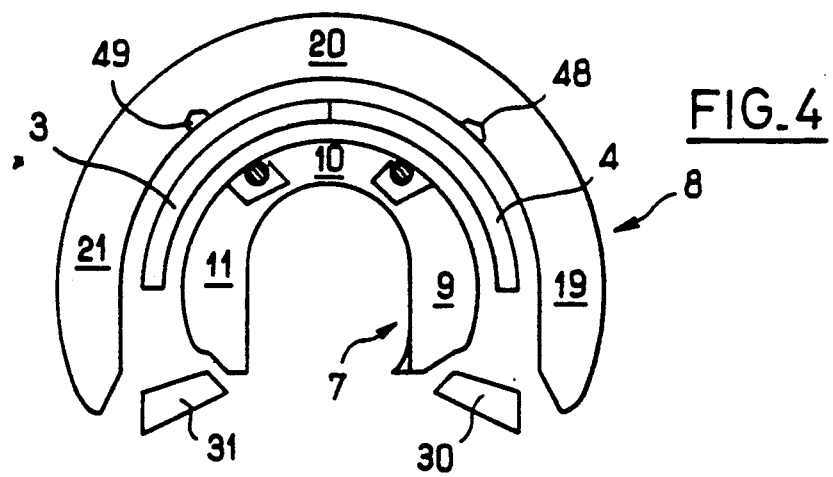
FIG. 4 is a cross sectional view of a cylindrical rotational actuator according to the present invention.

FIG. 4 illustrates a rotary actuator including a second magnetic circuit 8 occupying an angular sector of a cylinder having a circular section. The movable member comprising two magnetized portions 3, 4 in tile shape, namely the shape of a cylinder wall. These two portions are magnetized radially in opposite directions. The first magnetic circuit 7 is coaxial to the movable member and the second magnetic circuit 8. Further, it is cylindrical in shape and includes three poles 9, 10, 11. An electrical field coil is arranged within the notches provided between two consecutive poles. Stops 30, 31 restrain the movable member stroke. Machinings 48, 49 arranged symmetrically with respect to the first magnetic circuit notches 7 provide a balance of a force exerted onto the movable member.

Figure 5:
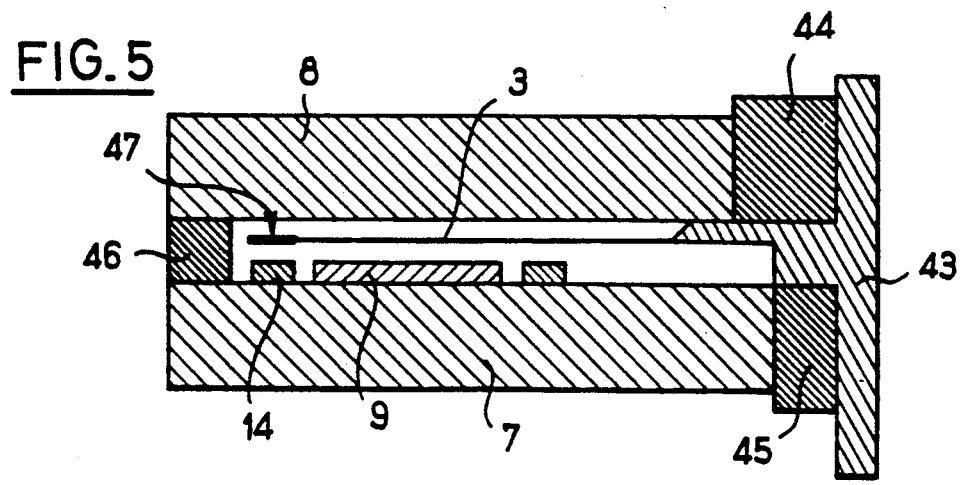
FIG. 5 is a sectional view of an alternative of a rotational actuator of the present invention.

The rotary actuator shown in FIG. 5 includes 2N portions transversely magnetized in alternate directions and the shape thereof corresponds to angular sectors of the thin disk. The stator structure includes a first magnetic circuit 7 and a second magnetic circuit 8. The first magnetic circuit 7 includes a high permeability magnetic material having a shape corresponding to an angular sector of a thick disk. The second magnetic circuit is of a complementary shape. The first magnetic circuit 7 includes magnetic poles surrounded by a coil 14. The shape of such magnetic poles 9 corresponds to annular angular sectors. Both magnetic circuits 7, 8 are connected through a non-magnetic angular spacer 46. The thin magnet 3 is held by a rigid frame 47 cooperating with an axial structure 43 guided by two ball bushings 44, 45. As previously noted, when the stator structure includes more than three magnetic poles, it is possible for one of the magnetic poles to be surrounded with an electrical coil serving, not for the energization, but for the automatic control.

Figure 6:
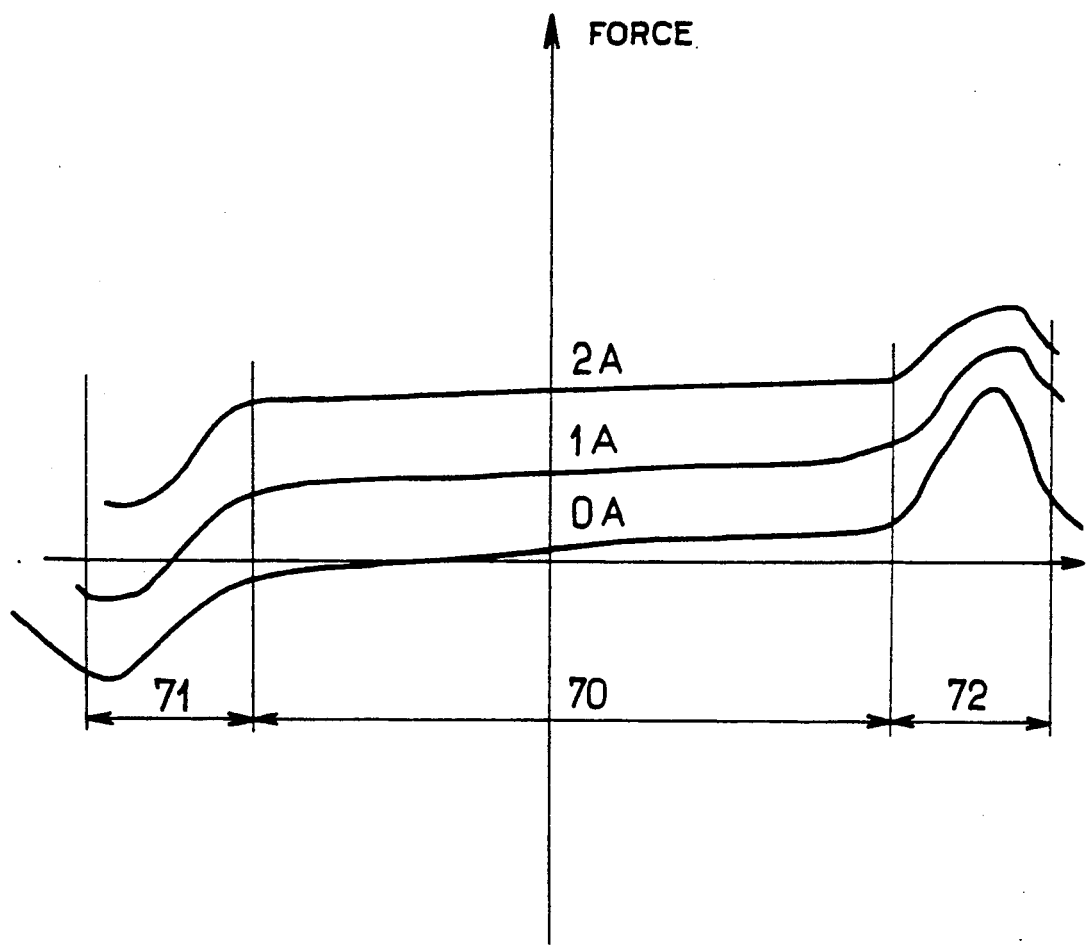
FIG. 6 is a graph showing the force against displacement curves.

FIG. 6 illustrates the force v. displacement curve depending on the various supply voltages of the energization coil 14. When the displacement is outside the area 70 wherein the force is constant, it leads to an area 71 or 72 wherein a release force is prevailing tending to provide an additional displacement, which would be limited by the stops 30, 31. In such areas 71, 72 a release force remains when the intensity of the coil 14 supplying current is null. If the size of bevels 22-25 is increased, the area 70 wherein a constant force is prevailing is diminished. If such bevels 22-25 were to be suppressed, it would lead to a sticking of the movable member at the limit-stops. In that case, the breakaway would require a high current detrimental to correct operation of the actuator.

Figure 7:
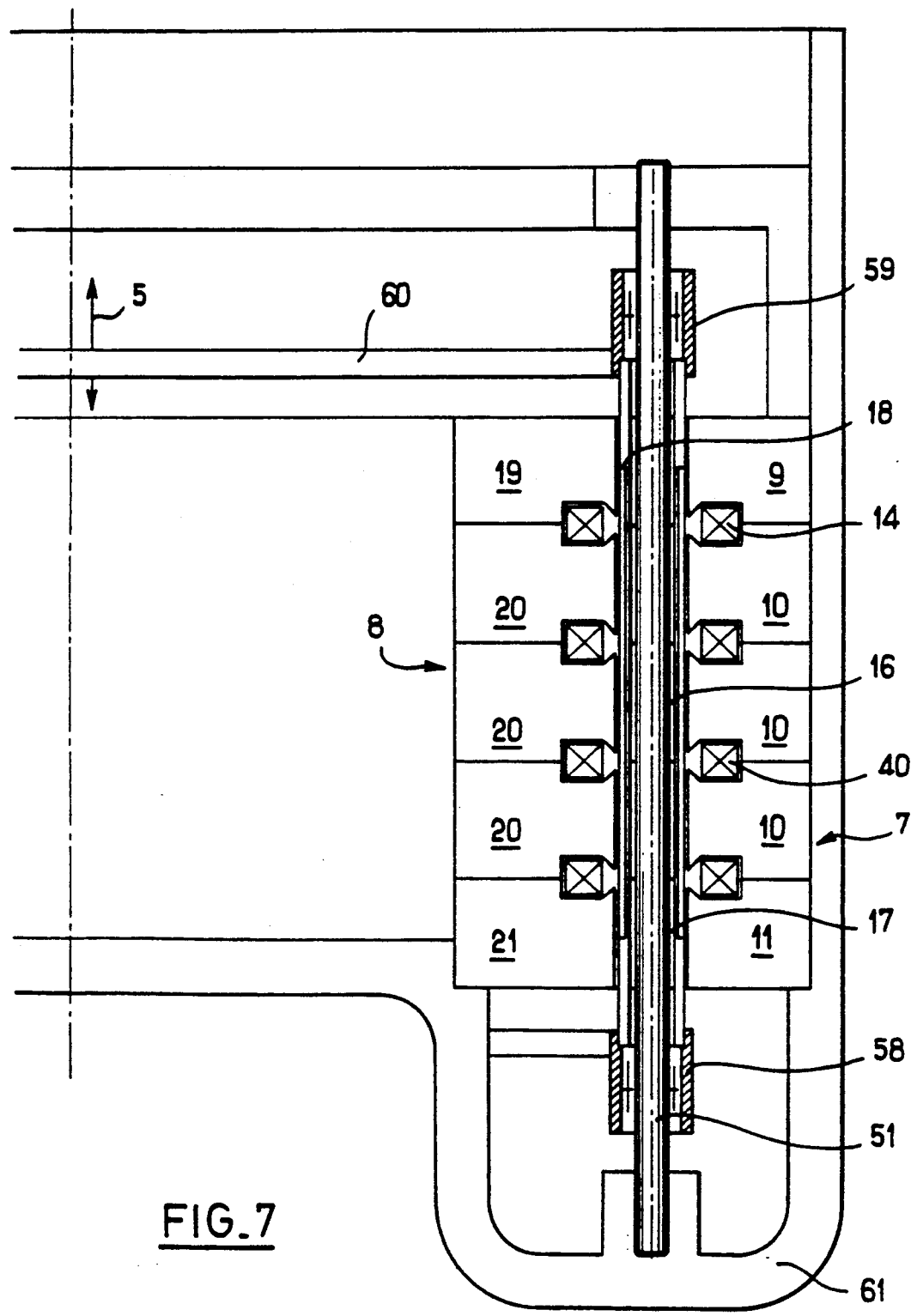
FIG. 7 is a sectional view of a cylindrical linear actuator.

FIG. 7 illustrates a linear actuator cylindrical shape, of large diameter. The stator structure includes a multiplicity of superimposed polar portions 19, 20, 21. It includes energization coils 14 as well as secondary servo-coils 40. The movable member is composed of a magnet bracket 17 including spacers arranged along radial planes. On such a magnet bracket are adhered thin parallel magnets 16, 18. Depending on the apparatus size, the magnets can be cylindrical thin magnets or else a multiplicity of thin magnets adhered onto the non-magnetic bracket so as to form the facets of a polygon. The magnet bracket 17 is made of a rigid material such as non-magnetic stainless steel. To each end, it includes a number of ball bushings 58, 59 cooperating with fixed guide columns 51. Such guide columns 51 are attached to a rack 61 and form a kind of cylindrical bar cage. The various higher ball bushings 59 are connected by a connecting part 60 composed of a rigid full disk. This connecting part is used to transmit the linear motion following the direction indicated by arrow 5. Of course, it is possible to provide along a number of polar edges one bevel or a slanting edge in order to adjust the locking. Naturally, both polar circuits are at no point connected through magnetic parts.

It is clear that the embodiments described in the foregoing are in no way limitative. In particular, the number of polar parts is not limited to three, and can be higher. Similarly, it is possible to only provide one bevelled strip, or, on the contrary, a plurality of edges provided with bevels.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A single-phase electromagnetic actuator having at least one stable position in the absence of current, comprising:
    a movable member movable in a motion direction Y;
    a stator structure governing said movable member along said motion direction Y, said stator structure including first and second magnetic circuits separated by an air gap E, said first magnetic circuit being formed of a very high permeability material and including N electric energization coils, where N is an integer, the first magnetic circuit including 2N+1 polar portions having lengths, measured along the motion direction Y of, respectively, $Y_1$, $Y_2$ and $Y_3$;
    the movable member comprising a thin portion magnetized normal to the motion direction Y forming 2N pairs of opposite and uniformly magnetized magnetic poles each pair having a length $Y_A$ measured in the motion direction Y, said thin magnetized portion being made of a material which in the full working range has a substantially linear demagnetization characteristic and a reversible permeability near that of air, and wherein the ratio of the magnetized portion length $Y_A$ to the air gap width E is above 4;
    wherein the lengths $Y_1$, $Y_2$ and $Y_3$ are at least equal to length $Y_A$ of one of the pairs of magnetized poles diminished by a length of the energization coil being accommodated in said stator structure; and
    said first magnetic circuit and said second magnetic circuit being connected only be non-magnetic parts, the movable member having a stroke displacement on each side of a medium position which is less than half the difference between the total length of the shortest magnetic circuit measured between the two outer side edges thereof and the total length of the magnetized portions.

2. A single-phased electromagnetic actuator according to claim 1, wherein:
    the movable member comprises an angular sector of a disk having 2N angular sectors transversely magnetized in alternate directions,
    the first magnetic circuit comprises an angular sector of a ring having a very high permeability including 2N+1 portions having approximately the same angular dimensions as the magnetized angular sectors, the first magnetic circuit including N energization electric coils, and
    said magnetic circuits are connected by non-magnetic spacers.

3. The single-phased electromagnetic actuator according to claim 1, wherein the second magnetic circuit has, facing the first magnetic circuit, notches.

4. A single-phased electromagnetic actuator according to claim 1, wherein the magnetized portion is tubular in shape and has first and second cylindrical portions radially magnetized in opposite directions, said movable portions moving axially within the air gap defined by the first magnetic circuit and the second magnetic circuit.

5. A single-phased electromagnetic actuator according to claim 4, wherein the second magnetic circuit comprises a cylinder made of very high permeability magnetic material.

6. A single-phased electromagnetic actuator according to claim 5, wherein said cylinder is integral with the cylindrical magnetized portions of said movable member, the cylindrical magnetic circuit length being at least equal to the sum of the length of the first magnetic circuit length and the displacement stroke along the movable axis.

7. A single-phased electromagnetic actuator according to claim 1, wherein the magnetized portion comprises at least two thin cylindrical portions of a cylinder having a central axis, symmetric with respect to the medium generatrix, said portions being magnetized radially in opposite directions, said movable member being movable in rotation about the central axis of said cylinder.

8. A single-phased electromagnetic actuator according to claim 1, wherein the movable member comprises two parallel thin magnets having each 2N portions magnetized transversely in opposite directions and connected by a magnet bracket, said thin magnets defining therebetween a space at least partially filled with a very high permeability magnetic material.

9. A single-phased electromagnetic actuator according to claim 8, comprising:
    means for guiding the magnet bracket, including plural columns arranged inside the magnet bracket and cooperating with ball bushings.

10. A single-phased electromagnetic actuator according to claim 1, wherein at least one of the magnetic circuits has on at least one edge thereof normal to the displacement direction of the movable member and the magnetization direction, a bevel, the actuator further including a stop for prohibiting displacement of the magnetized portion beyond the end area where a release force is decreasing.

11. A single-phased electromagnetic actuator according to claim 1, wherein the length $Y_2$ of the center polar portion is smaller than lengths $Y_1$ and $Y_3$ of side polar portions.

12. A single-phased electromagnetic actuator according to claim 10, wherein the stop is provided at a distance, smaller than the air gap width E, measured from the outer side edge of the shortest magnetic circuit.

13. A single-phased electromagnetic actuator according to claim 1, wherein the first magnetic circuit and the second magnetic circuit are symmetric with respect to the medium plane of the magnetized portion of the movable member normal to the magnetization direction.

14. A single-phased electromagnetic actuator according to claim 10, wherein the length, measured in the direction of the movable member displacement, of the bevel is within 1/5 and 1/20 of the length $Y_1$ of the corresponding polar portion.

15. A single-phased electromagnetic actuator according to claim 1, wherein at least one of the side edges of at least one of the magnetic circuits and the corresponding side edge of the magnetized portion form therebetween an angle within 0 to 10 degrees.

* * * * *